United States Patent

Krajewski

(10) Patent No.: US 8,893,584 B2
(45) Date of Patent: Nov. 25, 2014

(54) MOTOR VEHICLE DRIVE TRAIN DEVICE

(71) Applicant: Daimler AG, Stuttgart (DE)

(72) Inventor: Christian Krajewski, Ostfildern-Ruit (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/905,046

(22) Filed: May 29, 2013

(65) Prior Publication Data

US 2013/0327169 A1 Dec. 12, 2013

Related U.S. Application Data

(63) Continuation of application No. PCT/EP2011/005822, filed on Nov. 18, 2011.

(30) Foreign Application Priority Data

Nov. 30, 2010 (DE) .......................... 10 2010 052 952

(51) Int. Cl.
*F16H 37/06* (2006.01)
*B60K 23/08* (2006.01)
*F16H 3/02* (2006.01)
*B60K 17/348* (2006.01)

(52) U.S. Cl.
CPC ...... *F16H 3/02* (2013.01); *B60K 23/08* (2013.01); *B60K 17/348* (2013.01)
USPC .................. 74/665 GC; 74/665 H; 74/665 T

(58) Field of Classification Search
USPC ... 74/665 F, 665 G C, 665 H, 665 T; 475/221
See application file for complete search history.

(56) References Cited

U.S. PATENT DOCUMENTS

| | | | | |
|---|---|---|---|---|
| 5,135,071 | A | * | 8/1992 | Shibahata et al. ............. 180/249 |
| 5,141,072 | A | * | 8/1992 | Shibahata ..................... 180/245 |
| 5,219,038 | A | * | 6/1993 | Hamada et al. ............... 180/248 |
| 6,386,348 | B1 | * | 5/2002 | Kunii ............................. 192/35 |
| 2010/0248888 | A1 | * | 9/2010 | Hamperl et al. .............. 475/221 |

FOREIGN PATENT DOCUMENTS

| | | |
|---|---|---|
| DE | 40 00 667 A1 | 7/1990 |
| DE | 10 2005 045 007 A1 | 2/2008 |
| EP | 1 752 330 A2 | 2/2007 |
| EP | 2 105 336 A2 | 3/2009 |

* cited by examiner

*Primary Examiner* — Ha D Ho
(74) *Attorney, Agent, or Firm* — Klaus J. Bach

(57) ABSTRACT

In a motor vehicle drive train device with a transmission output shaft, a main drive train driven by the transmission output shaft, which has an axle drive for driving a main drive axle, an auxiliary drive train driven by the transmission output shaft, which has an axle drive for driving an auxiliary drive axle, a clutch unit for the switchable connection of the axle drive to the transmission output shaft, the axle drive of the main drive train and the axle drive of the auxiliary drive train have different transmission ratios and a transmission gearing for adapting a drive transmission ratio of the auxiliary drive train to a drive transmission ratio of the main drive train is adapted to compensate for the different transmission ratios of the main and the auxiliary drive axles.

1 Claim, 1 Drawing Sheet

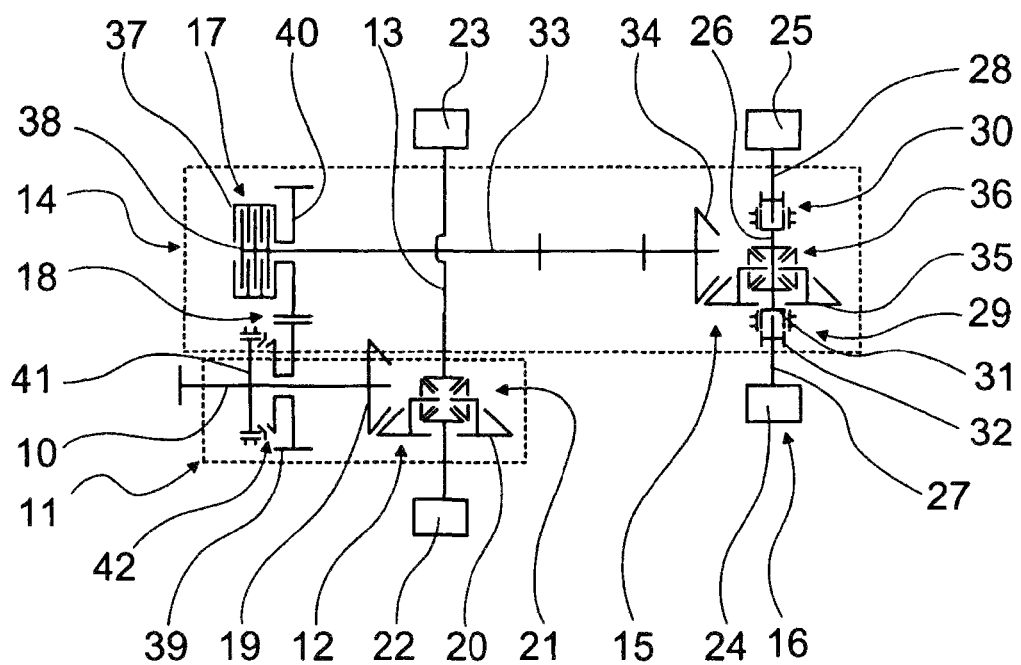

US 8,893,584 B2

MOTOR VEHICLE DRIVE TRAIN DEVICE

This is a Continuation-In-Part application of pending international patent application PCT/EP2011/005822 filed Nov. 18, 2011 and claiming the priority of German patent application 10 2010 052 952.4 filed Nov. 30, 2010.

BACKGROUND OF THE INVENTION

The invention relates to a motor vehicle drive train device arrangement with two drive axles and separate drive trains for the two drive axles.

A motor vehicle drive train device with a transmission output shaft is already known from DE 10 2006 045 007 A1, with a main drive train driven by the transmission output shaft, which has an axle drive for driving a main drive axle, with an auxiliary drive train driven by the transmission output shaft, which has an axle drive for driving an auxiliary drive axle, a clutch unit for the switchable connection of the axle drive to the transmission output shaft and a transmission gear unit.

It is the principal object of the invention to provide a simple motor vehicle drive train device that can be achieved by one particular standardization for various motor vehicle drive train device variants.

SUMMARY OF THE INVENTION

In a motor vehicle drive train device with a transmission output shaft, a main drive train driven by the transmission output shaft, which has an axle drive for driving a main drive axle, an auxiliary drive train driven by the transmission output shaft, which has an axle drive for driving an auxiliary drive axle, a clutch unit for the switchable connection of the axle drive to the transmission output shaft, the axle drive of the main drive train and the axle drive of the auxiliary drive train have different transmission ratios and a transmission gearing for adapting a drive transmission ratio of the auxiliary drive train to a drive transmission ratio of the main drive train is provided.

It is proposed that the axle drive of the main drive train and the axle drive of the auxiliary drive train have different transmissions ratios. Thus, particularly one part of the axle gear of the auxiliary drive train can remain equal for various embodiments of the motor vehicle drive train device, since an adjustment of various drive transmission ratios can be achieved advantageously via the transmission gearing step. Thus, by changing the transmission ratio of the transmission step for different drive transmission ratios of the main drive train, the drive transmission ratio of the auxiliary drive train can be adjusted, without the need for another axle drive in the auxiliary drive train. Thus the auxiliary drive train for various versions or vehicle models with different drive transmission ratios can be standardized in a particularly advantageous manner. "Drive axle" is understood to be; in particular, an arrangement of components arranged coaxially with respect to one another, which are provided for a drive of a motor vehicle. For the transmission of a drive torque, the drive axle in particular comprises two drive wheels and two wheel drive shafts, each of which is connected to one of the drive wheels for co-rotation. A "transmission output shaft" is understood to be, in particular, a gear shaft that has a final gear wheel of a gearing device. The "transmission output shaft" is preferably arranged downstream in a power flow of the gearing device and between the gear shaft and the auxiliary drive train. "Provided" is in particular to be understood as specially programmed, configured and/or equipped. "Axle drive" is, in particular, understood to be a device that switches a rotational movement or a torsional moment of a driveshaft around 90 degrees onto a drive axle. The axle drive preferably has a gear wheel on the input and output side, which are designed as bevel gears and cog with one another. The axle drive through the gear wheels preferably has a transmission ratio. A "drive transmission ratio of the auxiliary drive train" is, in particular, to be understood as a transmission ratio between the transmission output shaft and the output-side gear wheel of the axle drive of the auxiliary drive train. A "drive transmission ratio of the main drive train" is, in particular, understand to be a transmission ratio between the transmission output shaft and the output-side gear wheel of the axle drive of the main drive train. A "transmission ratio" is, in particular, understood to be a relationship of rotational speeds to one another. A "transmission ratio" is preferably understood to be a relationship of teeth numbers of two gear wheels engaging within one another. Here, "driven" is in particular to be understood as permanently connected. A "transmission step" is, in particular, understood to be a gearing device that consists of at least one gear wheel pairing and is provided to convert a torsional moment. It is particularly understood by "aligning" to mean that drive transmission ratios of the drive axles, which each have axle drives with different transmission ratios, have an essentially equal value due to a switched transmission before at least one of the drive axles. The drive transmission ratios of the auxiliary drive train and the main drive train are preferably exactly equal.

It is further proposed that the axle drive of the main drive train has a transmission ratio that is essentially greater than 1. Thus, a particularly advantageous motor vehicle drive train device can be provided. By "essentially greater", it is in particular to be understood that the transmission ratio of the axle drive of the main drive train is greater than 1 by a factor of 2, preferably by a factor of 2.5 and, in a particularly advantageous embodiment, by a factor of 3.4.

Furthermore, it is proposed that the transmission step has a transmission ratio that is not equal to 1 for an adaptation of the drive transmission ratios of the main drive train and the auxiliary drive train. Thus the drive transmission ratios of the main drive train and the auxiliary drive train can be adapted in a particularly simple manner.

The invention will become more readily apparent from the following description of an exemplary embodiment of the invention with reference to the accompanying drawing. The FIGURE, the description and the claims contain numerous features in combination. The person skilled in the art will also necessarily consider the features individually and may integrate them into further worthwhile combinations.

BRIEF DESCRIPTION OF THE DRAWINGS

FIG. 1 shows a schematically a motor vehicle drive train with a motor vehicle drive train device according to the invention in a motor vehicle that is not illustrated in greater detail here.

DESCRIPTION OF AN EXEMPLARY EMBODIMENT

A motor vehicle drive train as described herein is a load-bearing motor vehicle drive train. The motor vehicle drive train is divided into a main drive train 11 and a partially switchable auxiliary drive train 14. The motor vehicle drive train arrangement has a transmission output shaft 10, which is connected to a transmission of the motor vehicle that is not illustrated in greater detail. A drive machine that is not depicted in greater detail provides a torsional moment, which is supplied to the transmission output shaft 10 via the transmission.

The main drive train 11 comprises a permanently driven main drive axle 13. The main drive train 11 has an axle drive 12 connected to the main drive axle 13. The axle drive 12 connects the transmission output shaft 10 to the main drive axle 13. The axle drive 12 is driven by the transmission output shaft 10. The transmission output shaft 10 is always coupled to the axle drive 12 of the main drive axle 13. To connect the transmission output shaft 10 to the main drive axle 13, the axle drive 12 comprises a gear wheel 19 that is connected to the transmission output shaft 10 for co-rotation. The gear wheel 19 is in the form of a bevel gear. For the transmission of the torsional moment, the axle drive 12 has a second gear wheel 20 that is connected to the main drive axle 13. The second gear wheel 20 is also a bevel gear. The axle drive 12 comprises a differential 21 and a differential lock that is not depicted in greater detail. An input of the differential 21 is connected tightly to the second gear wheel 20 of the axle drive 12 and an output of the differential 21 is connected tightly to the main drive axle 13. Thus, the differential 21 connects the second gear wheel 20 to the main drive axle 13 for co-rotation. The main drive train 11 comprises two drive wheels 22, 23, which can be driven by means of the main drive axle 13. The axle drive 12 of the main drive axle 13 drives the drive wheels 22, 23 of the main drive axle 13. According to need, the differential lock locks the differential 21, while it connects the drive wheels 22, 23 to one another for co-rotation. The transmission output shaft 10 is always coupled to the main drive axle 13 via the axle drive 12.

The main drive train 11 has a drive transmission ratio. The drive transmission ratio of the main drive train 11 is a relationship between the rotational speed of the transmission output shaft 10 to the rotational speed of the main drive axle 13 and is defined as the transmission ratio of the axle drive 12. The axle drive 12 of the main drive train 11 has a transmission ratio that is essentially greater than 1. The transmission ratio of the axle drive 12 is defined by a relationship between a tooth number of the first gear wheel 19 and tooth number of the second gear wheel 20 of the axle drive 12. The transmission ratio of the axle drive 12 is greater than 1 if the tooth number of the first gear wheel 19 is greater than the tooth number of the second gear wheel 20. The axle drive 12 of the main drive train has a transmission ratio of 2.4117. Since the drive transmission ratio of the main drive train is defined as the transmission ratio of the axle drive 12, the drive transmission ratio of the main drive train is also 2.4117. It is essentially also conceivable for the axle drive 12 to have another transmission ratio, whereby the drive transmission ratio of the main drive train is also different.

The switchable auxiliary drive train 14 has a drivable auxiliary drive axle 16. The auxiliary drive axle 16 has two drive wheels 24, 25, which can be driven by means of the switchable auxiliary drive train 14. The auxiliary drive axle 16 comprises a main shaft 26, a first gear wheel shaft 27, which is connected to the drive wheel 24 for co-rotation, and a second gear wheel shaft 28, which is connected to the drive wheel 25 for co-rotation. For the mechanically separable connection of both gear wheel shafts 27, 28 to the main shaft 26, the auxiliary drive axle 16 comprises two clutch units 29, 30. The clutch unit 29 is arranged on the gear wheel shaft 27 and connects the gear wheel shaft 27 to the main shaft 26 in a mechanically separable manner. The clutch unit 30 is arranged on the gear wheel shaft 28 and connects the gear wheel shaft 28 to the main shaft 26 in a mechanically separable manner. The clutch units 29, 30 are designed as form-fit units. The clutch unit 29 is designed identically to the clutch unit 30. Only the clutch unit 29 is to be described below, wherein all features of the clutch unit 29 also apply for the clutch unit 30. Only its arrangement differentiates between the clutch units 29, 30. The clutch unit 29 comprises two clutch halves 31, 32 that are arranged for co-rotation with respect to one another. The clutch halves 31, 32 each have a claw toothing for a form-fit connection to one another. When the clutch unit 29 is in a closed state, both clutch halves 31, 32 remain in form-fit contact by means of the claw toothing and are thus connected to one another for co-rotation. The clutch unit 29 comprises an actuating device that is provided to bring both clutch halves 31, 32 into a form-fit state.

The auxiliary drive train 14 comprises an auxiliary driveshaft 33 that can be coupled to the transmission output shaft 10 and an axle drive 15 that is provided to connect the auxiliary drive axle 16 to the auxiliary driveshaft 33. The axle drive 15 comprises two gear wheels 34, 35. The first gear wheel 34 is connected to the auxiliary driveshaft 33 for co-rotation. The first gear wheel 34 is designed as a bevel gear. The second gear wheel 35 is also designed as a bevel gear. The axle drive 15 comprises a differential 36 for the distribution of torsional moments from the auxiliary driveshaft 33 to the gear wheel shafts 27, 28. The second gear wheel 35 is connected to an input of the differential 36 for co-rotation. The first gear wheel 34 and the second gear wheel 35 cog with one another and can thus transfer a moment from the auxiliary driveshaft 33 to the auxiliary drive axle 16. The axle drive 15 of the auxiliary drive train 14 has a transmission ratio of 3.417.

The auxiliary drive train 14 has a drive transmission ratio. The drive transmission ratio of the auxiliary drive train 14 is a relationship between the rotational speed of the transmission output shaft 10 and the rotational speed of the auxiliary drive axle 16. The drive transmission ratio of the auxiliary drive train 14 is essentially equal to the drive transmission ratio of the main drive train 11. The axle drive 15 of the auxiliary drive train 14 has a transmission ratio that is essentially greater than 1. The transmission ratio of the axle drive 15 is defined by the relationship between the tooth number of the first gear wheel 34 and the tooth number of the second gear wheel 35 of the axle drive 15. The transmission ratio of the axle drive 15 of the auxiliary drive train 14 differs from the transmission ratio of the axle drive 12 of the main drive train 11. Since the drive transmission ratio of the auxiliary drive train 14 is equal to the drive transmission ratio of the main drive train 11, the drive transmission ratio of the auxiliary drive train 14 is also 2.4117.

The auxiliary drive train 14 has a clutch unit 17 for the switchable connection of the auxiliary driveshaft 33 to the transmission output shaft 10. The clutch unit 17 connects the auxiliary drive train 14 to the main drive train 11. The clutch unit 17 connects the transmission output shaft 10 to the auxiliary driveshaft 33 in a mechanically separable manner. To that end, the clutch unit 17 has a first clutch half 37 and a second clutch half 38. The first clutch half 37 is designed as a clutch input and is connected to the transmission output shaft 10. The second clutch half 38 is designed as a clutch output and is connected the auxiliary driveshaft 33 for co-rotation. The two clutch halves 37, 38 are connected to one another for co-rotation when the clutch unit 17 is in a closed state. When the clutch unit 17 is in closed state, a torsional moment is transmitted between the clutch half 37 that is designed as a clutch input and the clutch half 38 that is designed as a clutch output. The clutch unit 17 is designed as a multi-disc clutch. The clutch unit 17 has several discs for the production of a co-rotational connection, which each have a friction pad. For the production of a frictionally engaged connection, the discs of the clutch unit 17 are pressed towards one another and the friction pads of the discs are in frictional engagement.

The auxiliary drive train 14 comprises a transmission gearing 18, which is provided to adapt the drive transmission ratio of the auxiliary drive train 14 to the drive transmission ratio of the main drive train 11. To that end, the transmission ratio of the transmission gearing 18 is not equal to 1. The drive transmission ratio of the auxiliary drive train 14 arises by multiplying the transmission ratio of the transmission gearing 18 by the transmission ratio of the axle drive 15 of the auxiliary drive train 14. Since the transmission ratio of the axle drive 12 of the main drive train 11 is not equal to the transmission ratio of the axle drive 15 of the auxiliary drive train 14, the transmission ratio of the transmission gearing 18 must be selected so as not to be equal to 1. To adapt the drive transmission ratio of the auxiliary drive train to the drive transmission ratio of the main drive train, which is at 2.4117, the transmission gearing 18 must have a transmission ratio that, when multiplied by the transmission ratio of the axle drive 15 of the auxiliary drive train 14, is just as large as the drive transmission ratio of the main drive train. The transmission ratio of the transmission gearing 18 is 0.7058.

To form a transmission, the transmission gearing 18 has a first gear wheel 39 and a second gear wheel 40. The first gear wheel 39 is connected to the transmission output shaft 10. The gear wheel 39 is designed as an idler and mounted for co-rotation on the transmission output shaft 10. For the co-rotational connection of the first gear wheel 39, the transmission gearing 18 has a fixed wheel 41, which is connected to the transmission output shaft 10 for co-rotation. The fixed wheel 41 can be connected in a form-fit manner to the gear wheel 39 of the transmission gearing 18, which is designed as an idler, by means of a sliding collar. A synchronization 42 is applied between the first gear wheel 39 of the transmission gearing 18, which is designed as an idler, and the fixed wheel 41, which aligns the rotational speeds of the fixed wheel 41 and the gear wheel 39 during a closing process of the sliding collar.

The second gear wheel 40 of the transmission gearing 18 is connected to the auxiliary driveshaft 33. The gear wheel 40 is designed as an idler and is mounted for co-rotation on the auxiliary driveshaft 33. The second gear wheel 40 of the transmission step 18 is connected for co-rotation with the first clutch half 37 of the clutch unit 17 for a co-rotational connection to the auxiliary driveshaft 33. When the clutch unit 17 is in a closed state, the second gear wheel 40 of the transmission step 18 is connected to the auxiliary driveshaft 33 for co-rotation.

What is claimed is:

1. A motor vehicle drive train arrangement with a main drive axle (13) and an auxiliary drive axle (15) having a transmission output shaft (10) with a main drive train (11) driven by the transmission output shaft (10), via an axle drive (12) for driving the main drive axle (13), and an auxiliary drive train (14) which is driven by the transmission output shaft (10), and which has the auxiliary drive axle (15) for driving the auxiliary drive axle (16), a clutch unit (17) for the switchable connection of the auxiliary drive axle (15) to the transmission output shaft (10) and a transmission gearing (18), with a transmission ratio selected so as to adapt a drive transmission ratio of the auxiliary drive train (14) to a different axle drive transmission ratio of the main drive train (11), the axle drive (12) of the main drive train (11) and the auxiliary drive axle (15) of the auxiliary drive train (14) having different transmission ratios, a concept of adapting the auxiliary drive train for drive train arrangements of vehicle models with different axle ratios by changing a drive ratio of the main drive axle (13) and adapting the transmission ratio of the transmission gearing (18) between the main drive train (11) and the auxiliary drive train (14) to accommodate the different main axle drive transmission ratio so as to permit the use of the same auxiliary drive axle (15) for the auxiliary drive train in connection with a different main drive train (11).

* * * * *